(12) United States Patent
Manabe et al.

(10) Patent No.: US 8,111,056 B2
(45) Date of Patent: Feb. 7, 2012

(54) CONVERTER CONTROL DEVICE FOR A BIDIRECTIONAL POWER SUPPLY SYSTEM HAVING PLURAL PARALLEL PHASES

(75) Inventors: Kota Manabe, Toyota (JP); Takahiko Hasegawa, Toyota (JP); Hiroyuki Imanishi, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 417 days.

(21) Appl. No.: 12/442,438

(22) PCT Filed: Oct. 1, 2007

(86) PCT No.: PCT/JP2007/069529
§ 371 (c)(1),
(2), (4) Date: Mar. 23, 2009

(87) PCT Pub. No.: WO2008/047616
PCT Pub. Date: Apr. 24, 2008

(65) Prior Publication Data
US 2010/0007319 A1 Jan. 14, 2010

(30) Foreign Application Priority Data
Oct. 17, 2006 (JP) .................................. 2006-282580

(51) Int. Cl.
*G05F 1/59* (2006.01)
(52) U.S. Cl. ........................................................ 323/272
(58) Field of Classification Search .................. 323/271, 323/272; 363/17, 89, 98
See application file for complete search history.

(56) References Cited

U.S. PATENT DOCUMENTS

| | | | | |
|---|---|---|---|---|
| 5,734,258 A * | 3/1998 | Esser | ............................. | 323/224 |
| 7,633,783 B2 * | 12/2009 | Manabe et al. | ............... | 363/149 |
| 7,715,217 B2 * | 5/2010 | Manabe et al. | ................. | 363/95 |
| 2005/0036337 A1 * | 2/2005 | Zhang et al. | .................... | 363/17 |
| 2007/0290667 A1 * | 12/2007 | Nagai et al. | ................... | 323/284 |
| 2008/0013351 A1 * | 1/2008 | Alexander | .................... | 363/123 |
| 2008/0062724 A1 * | 3/2008 | Feng et al. | ....................... | 363/17 |
| 2009/0059622 A1 * | 3/2009 | Shimada et al. | ............... | 363/17 |
| 2009/0190375 A1 * | 7/2009 | Manabe et al. | ................ | 363/17 |
| 2009/0316453 A1 * | 12/2009 | Manabe et al. | ................ | 363/78 |
| 2010/0007319 A1 * | 1/2010 | Manabe et al. | ............... | 323/285 |
| 2011/0089915 A1 * | 4/2011 | Qiu et al. | ...................... | 323/271 |

FOREIGN PATENT DOCUMENTS

| | | |
|---|---|---|
| DE | 102 05 069 A1 | 9/2002 |
| JP | 04-210732 A | 7/1992 |
| JP | 2003-111384 A | 4/2003 |

(Continued)

*Primary Examiner* — Jeffrey Sterrett
(74) *Attorney, Agent, or Firm* — Kenyon & Kenyon LLP (57) ABSTRACT

A converter device which is configured by connecting three converter circuits in parallel is provided between a secondary battery serving as a first power supply and a fuel cell serving as a second power supply. Two differential ammeters are placed on three reactors corresponding to the three converter circuits. A control unit includes a passing electric power calculation module which calculates electric power passing through the converter device on the basis of detected values of the two differential ammeters, an electric power equalization module which performs equalization of passing electric power between the respective converter circuits which constitute the converter device, a module for changing the number of drive phases which changes the number of drive phases of the converter device in response to the passing electric power, and a voltage conversion control module which controls the converter device and executes a desired voltage conversion.

14 Claims, 6 Drawing Sheets

FOREIGN PATENT DOCUMENTS

| | | |
|---|---|---|
| JP | 2003-235252 A | 8/2003 |
| JP | 2006-33934 A | 2/2006 |
| JP | 2006-217759 A | 8/2006 |
| JP | 2006-230137 A | 8/2006 |
| JP | 2006-311776 A | 11/2006 |
| WO | 2005/076433 A1 | 8/2005 |

* cited by examiner

$$\Delta I_A = I_{ave} - I_A$$
$$= I_B + \frac{X+Y}{3} - (X + I_B)$$
$$= \frac{Y - 2X}{3}$$

$$\Delta I_B = I_{ave} - I_B$$
$$= I_B + \frac{X+Y}{3} - I_B$$
$$= \frac{X+Y}{3}$$

$$\Delta I_C = I_{ave} - I_C$$
$$= I_B + \frac{X+Y}{3} - (Y + I_B)$$
$$= \frac{X + 2Y}{3}$$

FIG. 5

$$\text{Duty-A} = \text{Duty-A(old)} + K_A \frac{\dfrac{Y-2X}{3}}{\dfrac{P}{3V}}$$

$$= \text{Duty-A(old)} + K_A \frac{(Y-2X)V}{P}$$

$$\text{Duty-B} = \text{Duty-B(old)} + K_B \frac{\dfrac{X+Y}{3}}{\dfrac{P}{3V}}$$

$$= \text{Duty-B(old)} + K_B \frac{(X+Y)V}{P}$$

$$\text{Duty-C} = \text{Duty-C(old)} + K_C \frac{\dfrac{X-2Y}{3}}{\dfrac{P}{3V}}$$

$$= \text{Duty-C(old)} + K_C \frac{(X-2Y)V}{P}$$

FIG. 6

CONVERTER CONTROL DEVICE FOR A BIDIRECTIONAL POWER SUPPLY SYSTEM HAVING PLURAL PARALLEL PHASES

This is a 371 national phase application of PCT/JP2007/069529 filed 1 Oct. 2007, claiming priority to Japanese Patent Application No. JP 2006-282580 filed 17 Oct. 2006, the contents of which are incorporated herein by reference.

BACKGROUND OF THE INVENTION

The present invention relates to a converter control device and, more particularly, relates to a converter control device which is connected between a first power supply and a second power supply; includes a configuration in which a plurality of converters each having a plurality of switching elements and a reactor and performing voltage conversion bi-directionally are connected in parallel; and changes the number of converter phases to be driven in response to converter passing electric power.

In a power supply system which uses a fuel cell, electric power is supplied by providing a voltage converter which steps up or steps down an output of a secondary battery and by connecting the voltage converter to output terminals of the fuel cell in order to cope with load fluctuations that exceed electric generation capacity of the fuel cell, to increase system efficiency, and to recover regenerative electric power when a motor capable of regenerating is used as a load. In such a case, the voltage converter is a converter having a function of direct current voltage conversion and is also referred to as a DC/DC converter; and, for example, a voltage converter composed of switching elements and reactors is used. Then, in view of reducing the rating capacity of the switching element, a plurality of converters are connected in parallel.

For example, Japanese Unexamined Patent Publication No. 2006-33934 discloses that, in order to cope with rapid changes in load volume that exceed the generating capacity of a fuel cell, a voltage converter that operates in a plurality of phases is connected between the fuel cell and a battery, and changes in the number of phases and the duty ratio of the voltage converter are determined by estimating a change in load volume. Then, it is disclosed that, generally, in a voltage converter provided with a plurality of phases, loss electric power lost in the converter fluctuates according to a value of passing electric power which corresponds to input and output conversion energy volume and operational work volume; when the passing electric power is large, loss of three phase operation in which a number of phases is more is smaller than that of single phase operation; and when the passing electric power is small, the loss of the single phase operation is smaller than that of the three phase operation. That is, the reason is described that the loss in a three bridge converter includes a reactor copper loss of a reactor coil, a module loss by operation of a switching element, and a reactor iron loss of a reactor magnetic material; the reactor copper loss and the module loss increase with an increase of the passing electric power and the reactor copper loss and the module loss in the single phase operation are larger than that in the three phase operation; and the reactor iron loss is not significantly effected by the passing electric power and the reactor iron loss in the three phase operation is larger than that in the single phase operation. Then, it is described that the single phase operation is performed in a region where the passing electric power is small; the three phase operation is performed in a region where the passing electric power is large; and voltage, current, and electric power are temporarily fluctuated in proportional-integral-derivative (PID) control because an effective value of an alternating current for the voltage conversion is fluctuated when changing from the three phase operation to the single phase operation; therefore the duty ratio is made to be raised temporarily and electric power shortage is compensated.

Furthermore, Japanese Unexamined Patent Publication No. 2003-235252 discloses a method of maximizing conversion efficiency in the case where a plurality of DC/DC converters is provided between an inverter and a battery. In this publication, it is described that a master slave DC/DC converter in which one of the plurality of DC/DC converters is set as a master DC/DC converter is provided; input electric power or output electric power of the master DC/DC converter is set as reference electric power; the number of the DC/DC converters including the master DC/DC converter to be operated is specified; an output voltage of the master slave DC/DC converter is then increased and decreased within a range not exceeding the maximum allowable charging voltage and the maximum allowable charging current of the battery to calculate conversion efficiency thereof; and the output voltage is adjusted so as to substantially coincide with the maximum conversion efficiency. In addition, it is described that the conversion efficiency of the DC/DC converter includes a primary switching loss and a loss depending on a forward voltage drop of a secondary rectifier diode; a primary loss increases at a time of high input electric power; and at a time of low input electric power, the primary loss decreases and a secondary loss becomes dominant.

Japanese Unexamined Patent Publication No. 2003-111384 discloses a method in which frequency of use of a specific DC/DC converter does not increase in the case where voltage of electric power of a main power supply is converted by a plurality of DC/DC converters connected in parallel and is supplied to an auxiliary battery. In this publication, it is described that each starting order of the plurality of DC/DC converters is made to be changed in accordance with a predetermined specified order; and as for the predetermined specified order, voltage-current characteristics of the respective DC/DC converters are measured to be set in accordance with contents thereof.

As described above, in the configuration which is used by connecting a plurality of converters in parallel, control which changes the number of converter phases to be driven in response to the passing electric power is performed. In such a case, the passing electric power can be obtained by calculation using a map or the like, for example. To cite one example, output electric power of a secondary battery to the converter is obtained from measurement values of an output voltage and an output current of the secondary battery, a load loss is subtracted therefrom, and calculation is made by multiplying conversion efficiency of the converter, and accordingly the passing electric power of the converter is obtained. However because in such calculation there is a calculation delay or calculation error, the passing electric power of the converter cannot be properly obtained and it is not sufficient to adequately make the change of the number of phases of the converter follow fluctuation in load. Furthermore, when driving a plurality of phases it is not preferable that the passing electric power of each phase fluctuates.

SUMMARY OF THE INVENTION

An object of the present invention is to provide a converter control device which can properly obtain passing electric power of a converter. An other object of the present invention is to provide a converter device which can equalize passing electric power of each phase in the converters driven with a plurality of phases.

A converter control device of the present invention is a converter control device which is connected between a first power supply and a second power supply; includes a configuration that converters arranged in a plurality of phases each having a plurality of switching elements and a reactor and performing voltage conversion bi-directionally are connected in parallel; and changes the number of converter phases to be driven in response to converter passing electric power. The converter control device includes a current detection unit which detects a current flowing through the reactor; and a unit which obtains electric power passing through a driven converter on the basis of the detected current.

Furthermore, a converter control device of the present invention is a converter control device which is connected between a first power supply and a second power supply; includes a configuration that converters arranged in three phases each having a plurality of switching elements and a reactor and performing voltage conversion bi-directionally are connected in parallel; and changes the number of converter phases to be driven in response to converter passing electric power. Such a converter control device comprises a first differential ammeter which is placed between one common reactor of three reactors corresponding to three phases and one reactor that is one of remaining two reactors, and detects a difference between a current flowing through the common reactor and a current flowing through the one reactor; a second differential ammeter which is placed between the common reactor and the other reactor that is the other of the remaining two reactors, and detects a difference between the current flowing through the common reactor and a current flowing through the other reactor; and a unit which obtains electric power passing through a driven reactor on the basis of the detected value of the first differential ammeter and the detected value of the second differential ammeter.

Still furthermore, it is preferable that, in the converter control device according to the present invention, when the number of converter phases to be driven is a single phase, electric power passing through a driven reactor is obtained on the basis of the detected value of a differential ammeter placed on the driven reactor among the first differential ammeter and the second differential ammeter.

Yet furthermore, it is preferable that, in the converter control device according to the present invention, when the number of converter phases to be driven is two phases, a phase corresponding to the common reactor is stopped, and electric power passing through a driven reactor is obtained on the basis of the detected value of the first differential ammeter and the detected value of the second differential ammeter.

Further, it is preferable that the converter control device according to the present invention comprises an electric power equalization unit which obtains an average passed electric power at a time of driving a plurality of phases and equalizes respective phase electric powers.

Still further, it is preferable that the electric power equalization unit comprises an average passed current calculation unit which calculates an average passed current per phase by obtaining the sum of passing currents which flow through a plurality of phases on the basis of the detected value of the first differential ammeter and the detected value of the second differential ammeter; and a drive duty calculation unit which obtains each phase drive duty for equalizing each phase electric power from a difference between the average passed current and the passing current flowing through each phase.

Yet further, it is preferable that the electric power equalization unit executes a process which equalizes each phase electric power at every cycle of calculating the drive duty.

By employing at least one of the above configurations, the converter control device includes a configuration that converters arranged in three phases each having a plurality of switching elements and a reactor and performing voltage conversion bi-directionally are connected in parallel, and when the number of converter phases that is driven in response to converter passing electric power is changed, a current flowing through the reactor is detected, and electric power passing through a driven converter is obtained on the basis of the detected current. It is possible to detect a current flowing through the reactor in real time, and, by multiplying a voltage with the current, to determine the electric power passing through the converter in real time. Therefore, there is less calculation delay, calculation error, or the like as compared with calculation using a map or the like, and therefore a proper value for the passing electric power of the converter can be obtained.

Furthermore, two differential ammeters may be provided between the three reactors corresponding to each of the three phase converters, and electric power passing through a driven reactor may be obtained on the basis of the detected values of the two differential ammeters, making it possible to employ a simpler configuration compared with a configuration in which a current detector is placed on each of the three reactors.

Still furthermore, when the number of converter phases is a single phase, electric power passing through a driven reactor can be determined based on the detected value of a differential ammeter placed on the driven reactor among the first differential ammeter and the second differential ammeter. Yet furthermore, when the number of converter phases is two phases, a phase corresponding to the common reactor is stopped, and electric power passing through a driven reactor is obtained on the basis of the detected value of the first differential ammeter and the detected value of the second differential ammeter. As described above, even when the number of phases of the converter is changed, the electric power passing through the driven reactor can be determined based on the detected values of the two differential ammeters.

Further, an average passed electric power at a time of driving a plurality of phases may be obtained and respective phase electric powers are equalized such that respective loads can be equalized for respective converters among a plurality of converters.

Still further, an average passed current per phase may be calculated by obtaining the sum of passing currents which flow through a plurality of phases on the basis of the detected value of the first differential ammeter and the detected value of the second differential ammeter, and each phase drive duty which equalizes each phase electric power is obtained from a difference between the average passed current and the passing current flowing through each phase to enable each load to be equalized for each converter corresponding to each phase.

Yet further, a process which equalizes each phase electric power at every cycle of calculating drive duty may be executed; when this is done, a load can be equalized for each of a plurality of converters finely by very short time periods.

DETAILED DESCRIPTION OF THE PREFERRED EMBODIMENTS

An embodiment according to the present invention will be described below in detail referring to the drawings. In the following description, a vehicle-mounted power supply system which is connected to a motor generator for driving a vehicle will be described as an example of a power supply system to which a converter control device is applied. However, the present invention may also be configured as a converter control device applied to a power supply system other than that for vehicles. For example, the present invention may be applied to a power supply system fixed in a building or the like. Furthermore, although an example in which a first power supply is a nickel hydride secondary battery and a second power supply is a solid polymer membrane fuel cell will be described as a power supply system to which the converter control device is applied will be described, the present invention may be applied to other types of power supplies, such as, for example, one in which a lithium battery is used as the secondary battery and the fuel cell is not a solid electrolyte type. Further, although the example converter device described below is configured such that three converter circuits are connected in parallel is described, the number of converter circuits constituting the converter device may be two or four or more.

Figure 1:
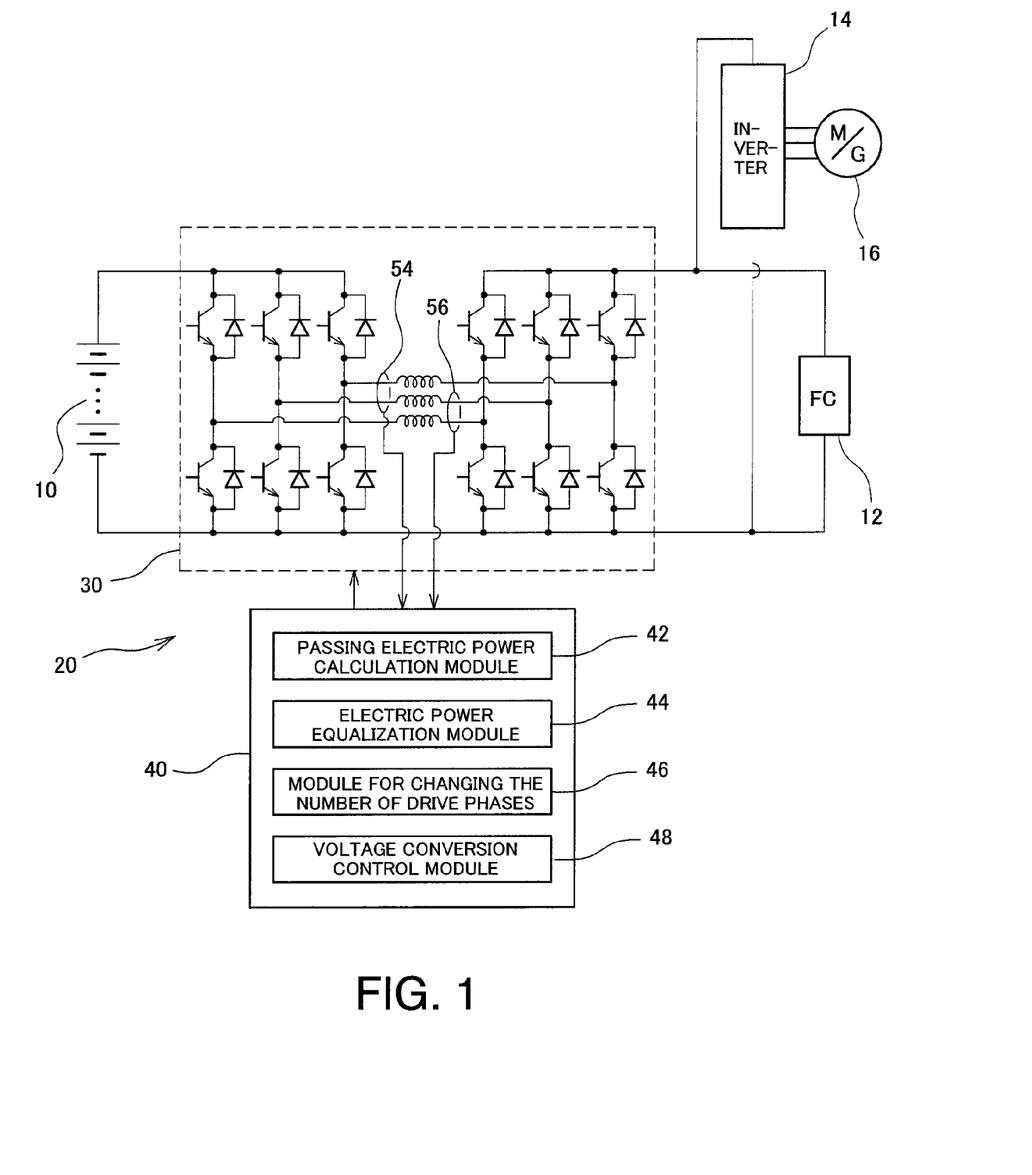
FIG. 1 is a diagram showing a configuration of a vehicular power supply system including a converter control device of an embodiment according to the present invention.

FIG. 1 is a diagram showing a configuration of a vehicular power supply system including a converter control device 20. In the illustrated configuration, the power supply system which is connected to a vehicular motor generator 16 comprises a secondary battery 10 as a first power supply, a fuel cell 12 as a second power supply, and a converter device 30 provided therebetween. The converter control device 20 is configured to include the converter device 30 and a control unit 40 so that an operation of the converter device 30 is controlled by the control unit 40.

The power supply system is connected to the motor generator 16 through an inverter 14. The inverter 14 converts direct current electric power of the above mentioned power supply system into three phases alternating current electric power and operates as a driving source of a vehicle by supplying the electric power to the motor generator 16. The inverter 14 has a function which converts regeneration energy to be recovered by the motor generator 16 into direct current electric power which is supplied to the power supply system as charging electric power when the vehicle is braked.

The secondary battery 10 is a chargeable and dischargeable high voltage power supply pack which is configured by combining a plurality of electric cells such as a nickel hydride electric cell and a lithium ion electric cell and is capable of supplying a desired high voltage. For example, the secondary battery 10 can supply a high voltage of approximately 200 V to 400 V between a positive bus line and a negative bus line.

The fuel cell 12 is an assembled battery which is configured by combining a plurality of cells of fuel cells so as to supply a generated electric power of a desired high-voltage, and is referred to as a fuel cell stack. Here, each of the cells of the fuel cells has a function in which hydrogen is supplied to the anode side as fuel gas, air is supplied to the cathode side as oxidation gas, and electric power is produced as a result of a battery chemical reaction through an electrolyte membrane that is a solid polymer membrane. The fuel cell 12 can supply a high-voltage of, for example, approximately 200 V to 400 V between the positive bus line and the negative bus line.

The converter device 30 comprises a plurality of converter circuits. The converter circuit is a direct voltage conversion circuit having a function which performs voltage conversion between the secondary battery 10 that is the first power supply and the fuel cell 12 that is the second power supply. In the converter device 30, a plurality of converter circuits is employed in order to cope with larger loads without increasing the rating capacity of electronic elements which constitute the converter circuit. In the example shown in FIG. 1, one converter device 30 is composed of three converter circuits connected in parallel. In such an example, the load of the converter circuits can be lightened by phase-shifting the three converter circuits with respect to each other by 120°, so-called, by performing three phase driving.

When, for example, the electric generation capacity of the fuel cell 12 cannot cope with load fluctuations of the motor generator 16 or the like, the converter device 30 has a function which voltage-converts electric power of the secondary battery 10, supplies the electric power to the fuel cell 12 side, and cope with the load of the motor generator 16 or the like as the entire power supply system.

The converter circuits constituting the converter device 30 comprises a primary switching circuit which includes a plurality of switching elements and a plurality of rectifiers provided on the first power supply side, a secondary switching circuit which includes a plurality of switching elements and a plurality of rectifiers provided on the second power supply side, and a reactor provided between the primary switching circuit and the secondary switching circuit.

The primary switching circuit can be configured by two switching elements connected in series between the positive bus line and the negative bus line of high voltage lines, and two rectifiers each connected in parallel to each of the switching elements. The switching element and the like connected to the positive bus line side are referred to as an upper side arm, and the switching element and the like connected to the negative bus line side are referred to as a lower side arm. The secondary switching circuit can also be configured similarly. As the switching element, a high voltage high power switching element, for example, an insulated gate bipolar transistor (IGBT) can be used, and a high power diode can be used as the rectifier.

The reactor is an element, such as an air-cored coil or a coil having a core, which is able to store or discharge magnetic energy. The reactor is provided connecting a node between two switching elements of the primary switching circuit and a node between two switching elements of the secondary switching circuit.

The converter circuit yields to ON/OFF control at appropriate timing for each of the upper side arm and the lower side arm which constitute the primary switching circuit and for each of the upper side arm and the lower side arm which constitute the secondary switching circuit, and, accordingly, it is possible to convert electric power produced on the first power supply side from electric energy into magnetic energy and temporarily store this energy in the reactor. The magnetic energy in the reactor can be then converted into electric energy again and supplied to the second power supply side as electric power. By adjusting the ON/OFF ratio of such switching, that is, a duty ratio, it is also possible to step up or step down the voltage of the first power supply side supplied to the second power supply side. Similarly, it is also possible to convert the voltage of the electric power of the second power and supply this power to the first power supply side.

Two differential ammeters 54 and 56 placed on the reactors have a function of detecting current flowing through the reactors. In order to detect the currents flowing through the reactors, a current detection element such as a current probe or the like may be placed on each of the reactors. In this embodiment, a configuration in which the first differential ammeter 54 is placed between a common reactor which is one of the three reactors corresponding to three phases and one reactor which is one reactor of the remaining two reactors, and the second differential ammeter 56 is placed between the common reactor and the other reactor which is the other reactor of the remaining two reactors is adopted, and accordingly the current passing through the converter device 30 is detected by the two differential ammeters. As the differential ammeter, a magnetic detection type current probe or the like having a coil which detects magnetic field generated by the current can be used.

The control unit 40 constitutes the converter control device 20 together with the converter device 30 and, more specifically, has a function which controls the voltage conversion operation of the converter device 30 in response to load. The control unit 40 can be configured by a vehicle-mounted computer. The control unit 40 may be configured by a free standing computer, but the function of the control unit 40 may be provided by another vehicle-mounted computer. For example, when a hybrid central processing unit (CPU) or the like is provided in a vehicle, the function of the control unit 40 can be provided by the hybrid CPU.

The control unit 40 includes a passing electric power calculation module 42 which calculates electric power passing through the converter device 30, an electric power equalization module 44 which performs equalization of passing electric power between respective converter circuits which constitute the converter device 30, a module 46 for changing the number of drive phases which changes the number of drive phases of the converter device 30 in response to the passing electric power, and a voltage conversion control module 48 which controls the converter device 30 to execute a desired voltage conversion. These functions can be realized by software and, more specifically, can be realized by executing a corresponding converter control program. Alternatively, some of these functions may be realized by hardware.

The voltage conversion control module 48 in the control unit 40 has a function which controls ON/OFF timing, an ON/OFF duty ratio, and the like of the respective switching elements which constitute the converter device 30, and executes the desired voltage conversion between the secondary battery 10 and the fuel cell 12. For example, it is possible that the voltage of the secondary battery 10 is stepped up by increasing the duty and supplied to the fuel cell 12 side, and the voltage of the secondary battery 10 is stepped down by decreasing the duty and supplied to the fuel cell 12 side.

Figure 2:
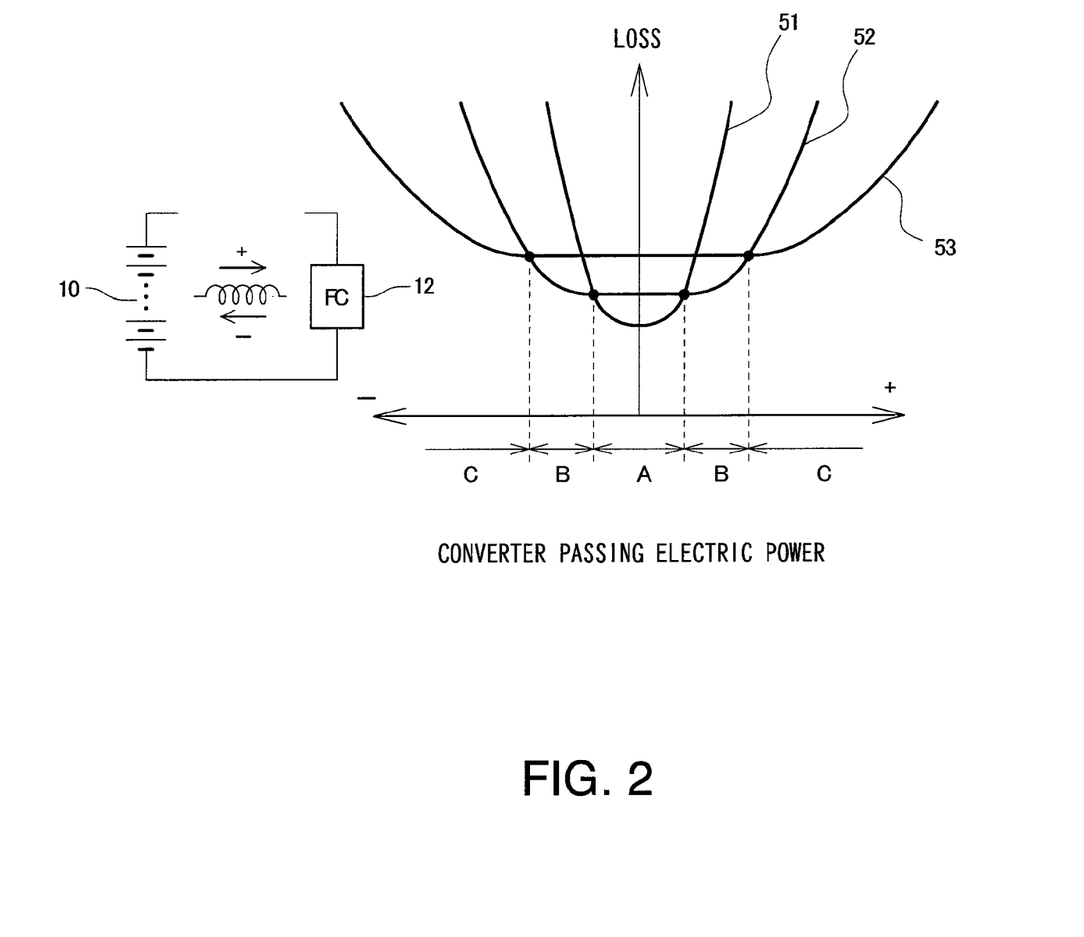
FIG. 2 is a diagram for typically explaining a relation between electric power passing through a converter device and loss of the converter device by setting the number of drive phases of the converter device as parameters in the embodiment according to the present invention.

The module 46 for changing the number of drive phases has a function which changes the number of drive phases for three converter circuits which constitute the converter device 30 in response to electric power passing through the converter device 30. FIG. 2 is a diagram for explaining a typical relationship between electric power passing through the converter device 30 and a loss of the converter device 30 by setting the number of drive phases of the converter device 30 as parameters. In FIG. 2, the horizontal axis shows the converter passing electric power and the vertical axis shows the loss of the converter device 30. The converter passing electric power is considered positive (+) when a current flows from the secondary battery side to the fuel cell side, and negative (−) when the current flows from the fuel cell side to the secondary battery side. In this figure are shown, for the converter device 30, a loss characteristic curve 51 during single phase driving in which only one converter circuit is driven, a loss characteristic curve 52 during two phase driving in which two converter circuits are driven, and a loss characteristic curve 53 during three phase driving in which three converter circuits are driven.

As described in the above-noted Japanese Unexamined Patent Publication No. 2006-33934, loss in the converter device using the switching elements and the reactors includes reactor copper loss in the reactor coil, module loss through operation of the switching element, and reactor iron loss of the reactor magnetic material. Of these, the reactor copper loss and the module loss increase with an increase of the passing electric power and the reactor copper loss and the module loss in the single phase operation are larger than that in the three phase operation, while the reactor iron loss is almost independent of the passing electric power and the reactor iron loss in the three phase operation is larger than that in the single phase operation. In FIG. 2, such a state is shown. That is, when the passing electric power is small and is in a range of "A", the loss characteristic curve 51 of single phase driving shows the smallest loss. Next, when the passing current increases and is in a range of "B", the loss characteristic curve 52 of two phase driving shows the smallest in loss. Further, when the passing electric power increases and is in a range of "C", the loss characteristic curve 53 of three phase driving shows the smallest loss.

On the basis of the results shown in FIG. 2, the module 46 for changing the number of drive phases of the control unit 40 directs the single phase driving when the passing electric power is in the range of "A", directs the two phase driving when the passing electric power is in the range of "B", and directs the three phase driving when the passing electric power is in the range of "C", in response to the passing electric power of the converter device 30.

In such a case, an intersection point between the loss characteristic curve 51 at the time of the single phase driving and the loss characteristic curve 52 at the time of the two phase driving is a branch point between the range of "A" and the range of "B", and an intersection point between the loss characteristic curve 52 at the time of the two phase driving and the loss characteristic curve 53 at the time of the three phase driving is a branch point between the range of "B" and the range of "C". Because the loss characteristic curves can be obtained in advance, a value of the passing electric power of changing between the single phase driving and the two phase driving that is the branch point between the range of "A" and the range of "B", and a value of the passing electric power of changing between the two phase driving and the three phase driving that is the branch point between the range of "B" and the range of "C" can be preset. If an earlier absolute value is set to a threshold $P_{12}$ of changing between the single phase and the two phases, and a subsequent absolute value is set to a threshold $P_{23}$ of changing between the two phases and the three phases, an absolute value P of the passing electric power of the converter device 30 is obtained, and control can be employed such that when $P \leq P_{12}$, single phase driving can be employed, when $P_{12} < P < P_{23}$, two phase driving can be employed, and when $P \geq P_{23}$, three phase driving can be employed.

Returning again to FIG. 1, the passing electric power calculation module 42 of the control unit 40 calculates electric power passing through the converter device 30 in real time using detected values of the two differential ammeters 54 and 56 provided on the reactors.

Figure 3A:
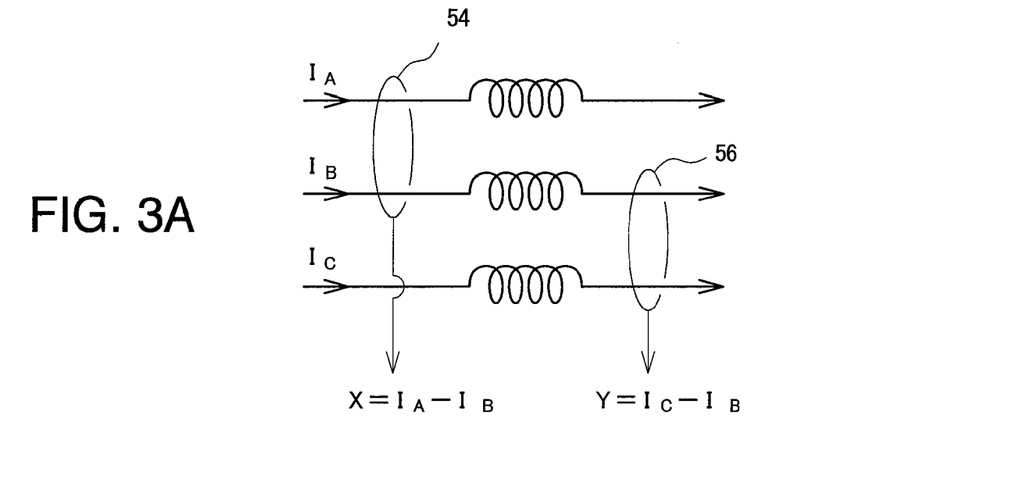
FIGS. 3A, 3B, and 3C are diagrams each showing a state in which passing current is obtained using two differential ammeters for every the number of drive phases of a converter device in the embodiment according to the present invention.
Figure 3B:
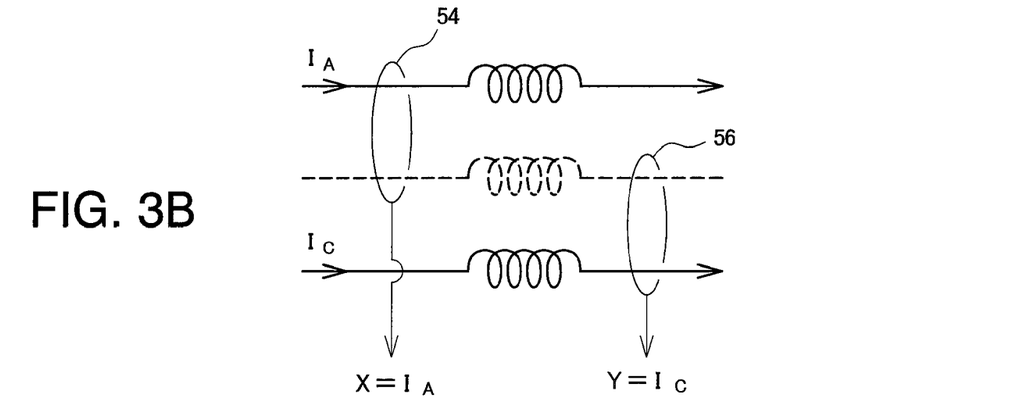
Figure 3C:
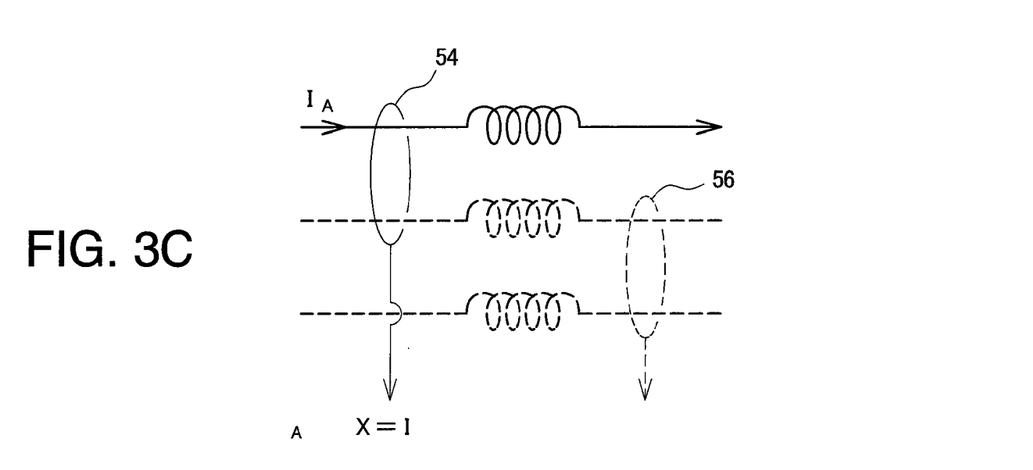

FIGS. 3A, 3B, and 3C are diagrams each showing a state in which passing currents are obtained using the two differential ammeters 54 and 56 for every the number of drive phases of the converter device 30. The reference numerals described in regards to FIG. 1 will be used for this description. FIG. 3A shows an example of three phase driving, that is, a case wherein respective currents flow through three reactors which respectively correspond to the three converter circuits. As shown in FIG. 3A, the currents which flow through the three reactors which correspond to the three phases are set to $I_A$, $I_B$, and $I_C$, respectively; and the reactor through which $I_B$ flows is set as a common reactor. The two differential ammeters 54 and 56 are units which detect the currents flowing through the reactors. The first differential ammeter 54 is placed between the common reactor and one reactor which is one of the remaining two reactors and through which the current $I_A$ flows. Therefore, the first differential ammeter 54 can detect a differential current $X = I_A - I_B$. The second differential ammeter 56 is provided between the common reactor and the other reactor which is the other of the remaining two reactors and through which the current $I_C$ flows. Therefore, the second differential ammeter 56 can detect a differential current $Y = I_C - I_B$. The currents $I_A$, $I_B$, and $I_C$ flowing through each reactor can be obtained from the detected values.

FIG. 3B shows an example of two phase driving, that is, a case wherein respective currents flow through two reactors which respectively correspond to two of the three converter circuits. In this case, a reactor corresponding to a converter circuit which is not driven is set as a common reactor, and two differential ammeters 54 and 56 are provided. That is, as shown in FIG. 3B, the first differential ammeter 54 is provided between the common reactor through which no current flows and a reactor through which a current $I_A$ flows, and the second differential ammeter 56 is provided between the common reactor through which no current flows and a reactor through which a current $I_C$ flows. Therefore, the first differential ammeter 54 can detect a differential current $X = I_A$; and the second differential ammeter 56 can detect a differential current $Y = I_C$.

In other words, when changing from the three phase driving to the two phase driving, driving of the converter circuit corresponding to the common reactor in which the two differential ammeters 54 and 56 are commonly provided can be prevented. By doing so, it becomes possible to directly detect currents flowing through driven reactors while changing the number of phases of the converter device 30, without changing the connections of either of the two differential ammeters 54 and 56.

FIG. 3C shows an example of single phase driving, that is, a case wherein a current flows through only one reactor which corresponds to one of the three converter circuits. In this case, a differential ammeter connected to a reactor which corresponds to a driven converter circuit is used to detect the current flowing through the reactor. In FIG. 3C, there is shown an example wherein a differential current $X = I_A$ is detected by the first differential ammeter 54 when it is assumed that a reactor through which a current $I_A$ flows is driven. In other example, when a converter circuit corresponding to a reactor through which the current $I_C$ described in FIG. 3A flows is driven, a differential current $Y = I_C$ can be detected using the second differential ammeter 56. When the converter circuit corresponding to the common reactor is driven, the differential current $X = -I_B$ or the differential current $Y = -I_B$ can be detected using the first differential ammeter 54 or the second differential ammeter 56.

As described above, the respective currents flowing through the reactors corresponding to the driven converter circuits can be determined in real time from the detected values of the two differential ammeters 54 and 56. Therefore, electric power passing through the converter device 30 can be calculated in real time using the detected current values and a voltage applied to the converter device 30, that is, the voltage of the secondary battery 10 or the fuel cell 12. In addition, even when the converter device 30 comprises a plurality of converter circuits other than three converter circuits, passing electric power of the converter device can still be obtained in real time because the currents which flow through the respective reactors are detected by the appropriate number of current detection units. Furthermore, because, as described above, the differential ammeters are used, the passing electric power of the converter device can be obtained using a number of current detection units less than that of the reactors.

Returning again to FIG. 1, the electric power equalization module 44 of the control unit 40 has a function which equalizes the currents flowing through the respective converter circuits constituting the converter device 30, that is, a function which equalizes the respective passing electric powers between the respective converter circuits. More specifically, the electric power equalization module 44 has functions such as obtaining an average passed electric power at a time of driving three phases and executing a change of switching duty in each phase so that electric power of each phase becomes ⅓ of the average passed electric power. It is preferable that these functions are performed at every cycle of calculating drive duty at a time of voltage conversion. By doing so, the electric power passing through each converter circuit can be finely equalized by very short time periods.

Figure 4:
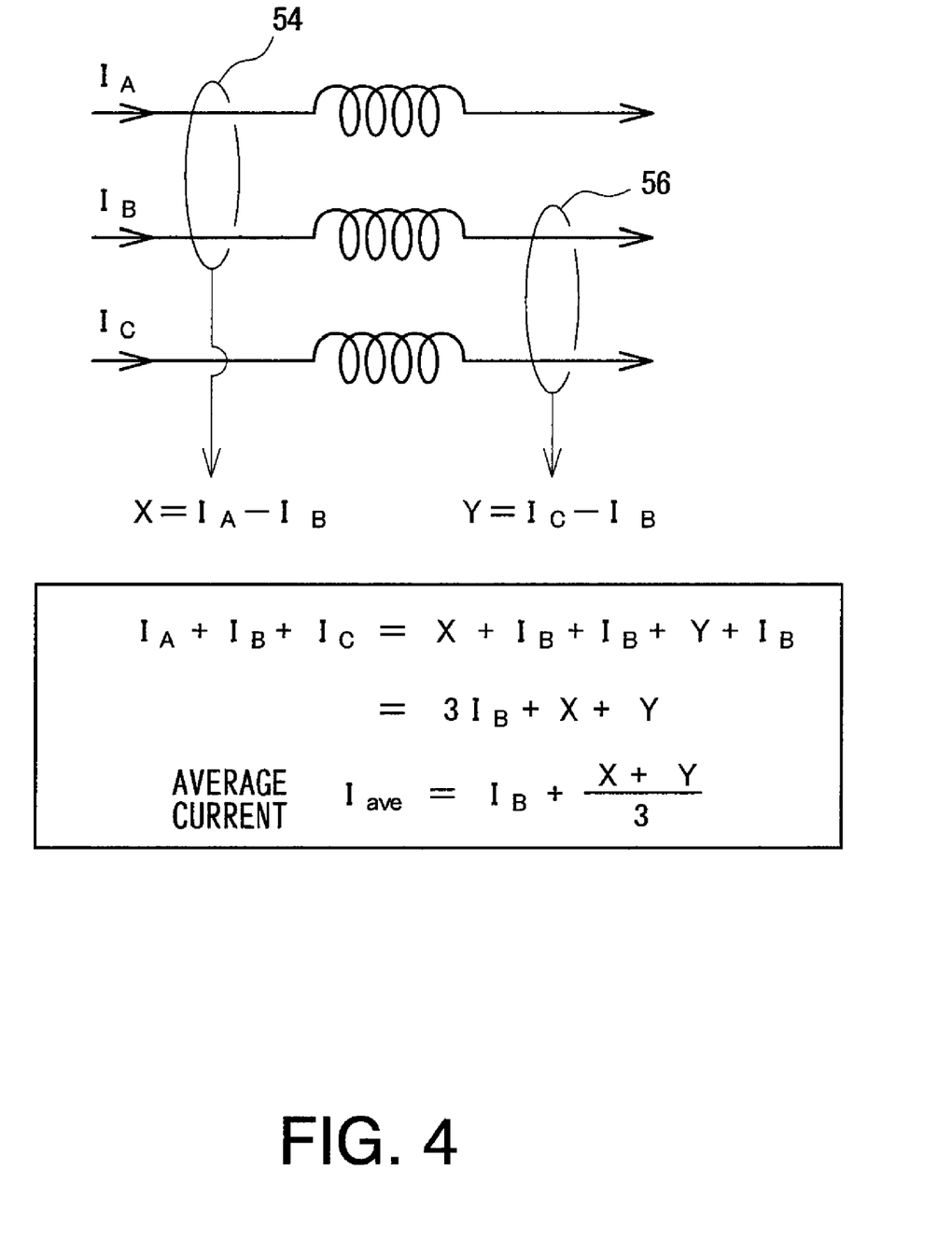
FIG. 4 is a diagram showing a state in which average passed current per phase is calculated by obtaining the sum of passing currents which flow through three phases on the basis of a detected value of a first differential ammeter and a detected value of a second differential ammeter in the embodiment according to the present invention.

FIG. 4 is a diagram showing a state in which average passed current per phase is calculated by obtaining the sum of passing currents which flow through three phases on the basis of a detected value X of the first differential ammeter 54 and a detected value Y of the second differential ammeter 56. As described in FIG. 3A, when the currents flowing through the three reactors are $I_A$, $I_B$, and $I_C$, respectively, the detected value of the first differential ammeter 54 is $X = I_A - I_B$ and the detected value of the second differential ammeter 56 is $Y = I_C - I_B$. Therefore, the total sum of the passing currents flowing through the three phase becomes $I_A + I_B + I_C = 3I_B + X + Y$. In this case, as previously described, $I_B$ is the current flowing through the common reactor. For this reason, the average passed current per phase at a time of driving three phases becomes $I_{ave} = I_B + (X+Y)/3$ and an output voltage V of the secondary battery or the fuel cell is multiplied to the average passed current, and accordingly the average passed electric power per phase can be obtained.

Figure 5:
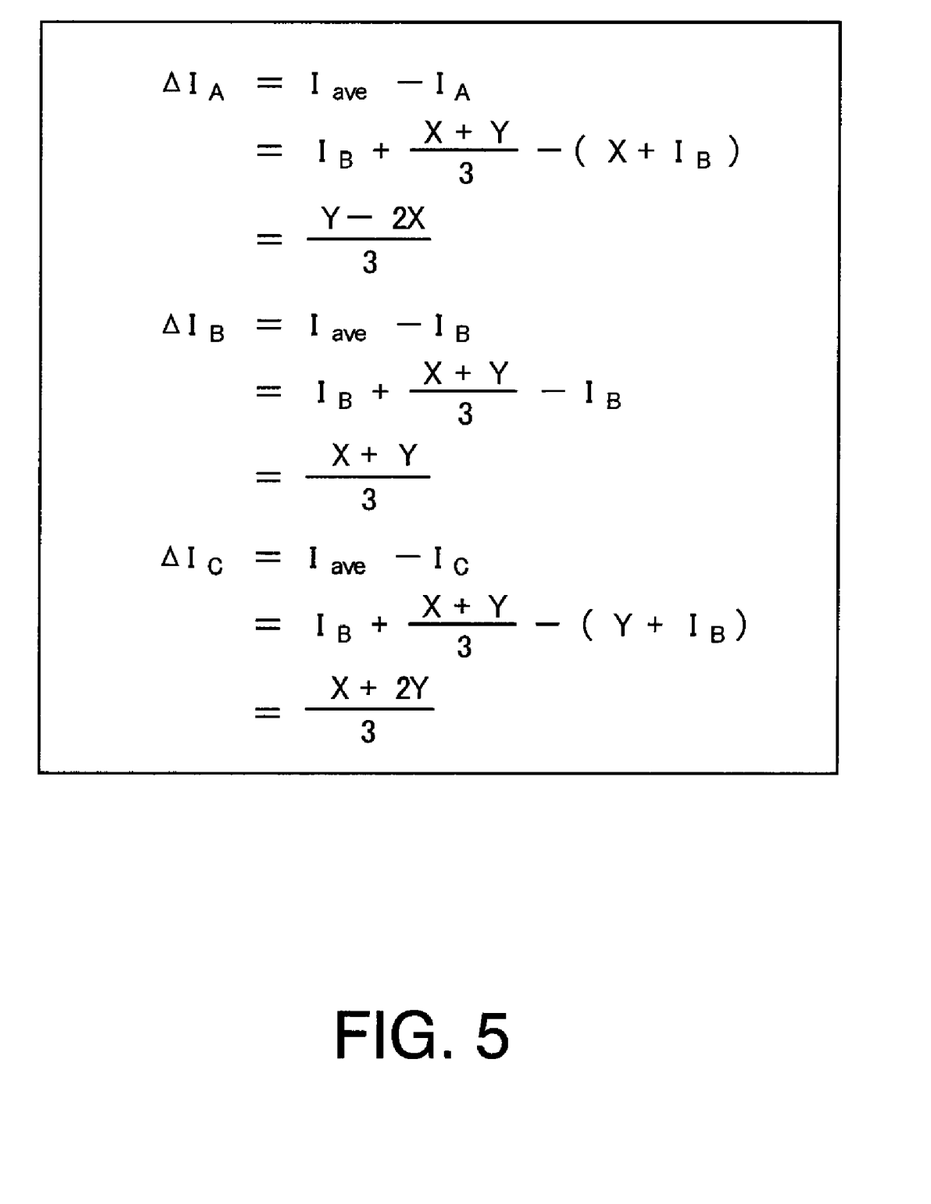
FIG. 5 is a view showing a state in which a deviation between an average passed current value per phase and a value of current which flows through each phase of the converter device is obtained in the embodiment according to the present invention.

FIG. 5 is a view showing a state in which a deviation between an average passed current value per phase and a value of current which flows through each phase is obtained. For example, a deviation $\Delta I_B$ from an average passed current value $I_{ave}$ of the current value $I_B$ flowing through the common reactor becomes $\Delta I_B = I_{ave} - I_B = I_B + [(X+Y)/3] - I_B = (X+Y)/3$; therefore the deviation $\Delta I_B$ can be obtained by the detected value X of the first differential ammeter 54 and the detected value Y of the second differential ammeter 56. Deviations from the average passed current values of the current values flowing through other reactors can be also obtained by the detected value X of the first differential ammeter 54 and the detected value Y of the second differential ammeter 56, as shown in FIG. 5.

Figure 6:
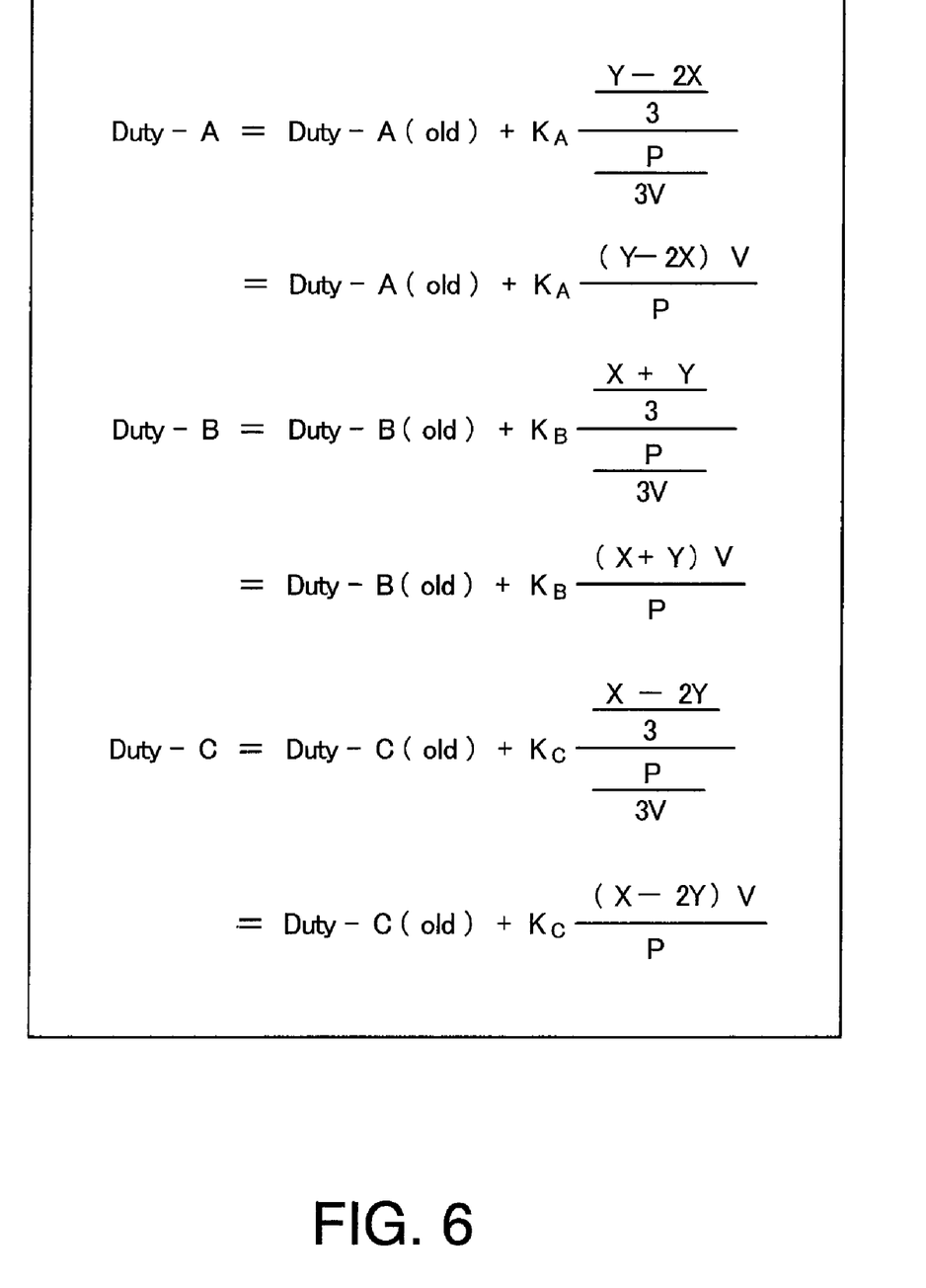
FIG. 6 is a view showing a state in which drive duty of each phase of the converter device is changed in order that a deviation from an average passed current value of a passing current value in each phase is reduced close to zero in the embodiment according to the present invention.

FIG. 6 is a view showing a state in which drive duty of each phase is changed in order that the deviation from an average passed current value of the passing current value in each phase obtained in FIG. 5 is reduced close to zero. For example, in order that the deviation $(X+Y)/3$ from the average passed current value $I_{ave}$ of the current value $I_B$ flowing through the common reactor is reduced close to zero, a predetermined coefficient is multiplied to a ratio of the deviation with respect to nominal passing current, and accordingly previous duties are corrected. In FIG. 6, when a drive duty immediately before the present one is set to Duty-B(old), a nominal passing electric power is set to P, a voltage of the secondary battery or the fuel cell is set to V, a nominal passing current per phase can be set to P/3V. Therefore, the resultant in which a coefficient $K_B$ is multiplied to the ratio of the deviation $(X+Y)/3$ with respect to the nominal passing current is added to the Duty-B(old), and thereby the next drive duty "Duty-B" is set. That is, the next drive duty "Duty-B" is set to Duty-B=Duty-B(old)+$K_B$[[(X+Y)/3]/[P/3V]], and accordingly the deviation $(X+Y)/3$ from the average passed current value $I_{ave}$ of the current value $I_B$ flowing through the common reactor can be reduced close to zero. Similarly, also as for the passing current values of other phases, a duty change value which is for approximating the average passed current $I_{ave}$ as much as possible can be obtained.

As described above, the currents flowing through the reactors are detected using the differential ammeters, and the passing electric power passing through the converter device can be calculated in real time based on the detected values; furthermore, even when there are differences mutually in the currents flowing through the respective phases, average passed current or average passed electric power per phase can be calculated, and the amount of correction of drive duty in each phase which is for equalizing the passing current or the passing electric power between the respective phases can be obtained. This enables the number of drive phases of the converter device to be accurately changed in response to load fluctuations or the like, and makes it possible to equalize the active states of the respective phases of the converter device.

INDUSTRIAL APPLICABILITY

The present invention is used for converter control devices. More particularly, the present invention is used for a converter control device which is connected between a first power supply and a second power supply, includes a configuration that a plurality of converters each having a plurality of switching elements and a reactor and performing voltage conversion bi-directionally are connected in parallel, and changes the number of converter phases to be driven in response to converter passing electric power.

What is claimed is:

1. A system for supplying electric power comprising:
a converter control device which is connected between a first power supply and a second power supply, the converter control device including a configuration of converters where the converters are arranged in a plurality of phases each having a plurality of switching elements and a reactor, and the converters perform voltage conversion bi-directionally and are connected in parallel; and the converter control device changes the number of converter phases to be driven in response to electric power passing through said converters, said converter control device comprising:
a current detection unit which detects a current flowing through said reactor; and
a unit which obtains electric power passing through a driven converter on the basis of the current detected by said current detection unit.

2. The system according to claim 1,
wherein said converters are arranged in three phases and said current detection unit includes a first differential ammeter and a second differential ammeter:
said first differential ammeter is placed between one common reactor of three reactors corresponding to three phases and one reactor that is one of the remaining two reactors, and detects a difference between a current flowing through said common reactor and a current flowing through said one reactor;
said second differential ammeter is placed between said common reactor and the other reactor that is the other of said remaining two reactors, and detects a difference between the current flowing through said common reactor and a current flowing through the other reactor; and
said unit obtains electric power passing through a driven reactor on the basis of the detected value of said first differential ammeter and the detected value of said second differential ammeter.

3. The system according to claim 2,
wherein when the number of converter phases to be driven is a single phase, electric power passing through a driven reactor is obtained on the basis of the detected value of the differential ammeter placed on said driven reactor among said first differential ammeter and said second differential ammeter.

4. The system according to claim 2,
wherein when the number of converter phases to be driven is two phases, a phase corresponding to said common reactor is stopped, and electric power passing through a driven reactor is obtained on the basis of the detected value of said first differential ammeter and the detected value of said second differential ammeter.

5. The system according to claim 1,
further comprising an electric power equalization unit which obtains an average passed electric power at a time of driving a plurality of phases and equalizes respective phase electric powers.

6. The system according to claim 5,
wherein said electric power equalization unit includes:
an average passed current calculation unit which calculates an average passed current per phase by obtaining the sum of passing currents which flow through a plurality of phases on the basis of the detected value of said first differential ammeter and the detected value of said second differential ammeter; and a drive duty calculation unit which obtains each phase drive duty for equalizing each phase electric power from a difference between the average passed current and the passing current flowing through each phase.

7. The system according to claim 6, wherein said electric power equalization unit executes a process which equalizes each phase electric power during every drive duty calculation cycle.

8. The system according to claim 1,
wherein the loss of said converter has a loss component in which the less the number of driven phases decreases, the more the loss increases, because the loss increases with an increase of the passing electric power of said reactor; and a loss component in which the more the number of driven phases increases, the more the loss increases without depending on the passing electric power of said reactor, and
the change in the number of the converter phases is effected such that the number of the converter phases increases in response to an increase of passing electric power in order to reduce a total loss.

9. A converter control device which is connected between a first power supply and a second power supply includes a configuration of converters where the converters are arranged in a plurality of phases each having a plurality of switching elements and a reactor, and the converters perform voltage conversion bi-directionally and are connected in parallel; and the converter control device changes the number of converter phases to be driven in response to electric power passing through said converters, said converter control device comprising:
a current detection unit which detects a current flowing through said reactor; and
a unit which obtains electric power passing through a driven converter on the basis of the current detected by said current detection unit,
wherein said converters are arranged in three phases and said current detection unit includes a first differential ammeter and a second differential ammeter:
said first differential ammeter is placed between one common reactor of three reactors corresponding to three phases and one reactor that is one of the remaining two reactors, and detects a difference between a current flowing through said common reactor and a current flowing through said one reactor;
said second differential ammeter is placed between said common reactor and the other reactor that is the other of said remaining two reactors, and detects a difference between the current flowing through said common reactor and a current flowing through the other reactor; and
said unit obtains electric power passing through a driven reactor on the basis of the detected value of said first differential ammeter and the detected value of said second differential ammeter.

10. The converter control device according to claim 9,
wherein when the number of converter phases to be driven is a single phase, electric power passing through a driven reactor is obtained on the basis of the detected value of the differential ammeter placed on said driven reactor among said first differential ammeter and said second differential ammeter.

11. The converter control device according to claim 9,
wherein when the number of converter phases to be driven is two phases, a phase corresponding to said common reactor is stopped, and electric power passing through a driven reactor is obtained on the basis of the detected value of said first differential ammeter and the detected value of said second differential ammeter.

12. A converter control device which is connected between a first power supply and a second power supply includes a configuration of converters where the converters are arranged in a plurality of phases each having a plurality of switching elements and a reactor, and the converters perform voltage conversion bi-directionally and are connected in parallel; and the converter control device changes the number of converter phases to be driven in response to electric power passing through said converters, said converter control device comprising:
a current detection unit which detects a current flowing through said reactor;
a unit which obtains electric power passing through a driven converter on the basis of the current detected by said current detection unit, and,
an electric power equalization unit which obtains an average passed electric power at a time of driving a plurality of phases and equalizes respective phase electric powers.

13. The converter control device according to claim 12,
wherein said electric power equalization unit includes:
an average passed current calculation unit which calculates an average passed current per phase by obtaining the sum of passing currents which flow through a plurality of phases on the basis of the detected value of said first differential ammeter and the detected value of said second differential ammeter; and
a drive duty calculation unit which obtains each phase drive duty for equalizing each phase electric power from a difference between the average passed current and the passing current flowing through each phase.

14. The converter control device according to claim 13,
wherein said electric power equalization unit executes a process which equalizes each phase electric power during every drive duty calculation cycle.

* * * * *